United States Patent

Ohtsuka et al.

[11] Patent Number: 5,407,283
[45] Date of Patent: Apr. 18, 1995

[54] BEARING DEVICE FOR MOTOR

[75] Inventors: Shigeru Ohtsuka; Takehito Tsukada, both of Yonago, Japan

[73] Assignee: Matsushita Electric Industrial Co., Ltd., Osaka, Japan

[21] Appl. No.: 191,104

[22] Filed: Feb. 3, 1994

[30] Foreign Application Priority Data

Mar. 3, 1993 [JP] Japan .................. 5-042371

[51] Int. Cl.6 .......................................... F16C 33/74
[52] U.S. Cl. .................................. 384/130; 384/151
[58] Field of Search ............... 384/130, 151, 322, 132, 384/446, 477

[56] References Cited

U.S. PATENT DOCUMENTS 4,600,318  7/1986  Miller ............................ 384/130
5,035,681  7/1991  Hertel et al. ..................... 384/130
5,145,266  9/1992  Saneshige et al. .

FOREIGN PATENT DOCUMENTS 6336223  7/1981  Japan .

Primary Examiner—Lenard A. Footland
Attorney, Agent, or Firm—Stevens, Davis, Miller & Mosher

[57] ABSTRACT

The invention relates to a bearing device for a motor comprising a rotor frame with a field magnet provided on an inner periphery thereof, a shaft coupled to the rotor frame, an oilless bearing for rotatably supporting the shaft, a stator fixedly accommodating the oilless bearing, and a stator fixed to an outer peripheral portion of the stator boss. The bearing device comprises an annular oil seal washer made of a viscoelastic member with an least an adhesive layer provided on a surface thereof, and a substantially disk shaped resin cap. The oil seal washer is sandwiched between an end surface of the stator boss and the resin cap fixed on an inner peripheral surface of a stator boss supporting portion.

4 Claims, 2 Drawing Sheets

BEARING DEVICE FOR MOTOR

BACKGROUND OF THE INVENTION

1. Field of the Invention

The present invention relates to a bearing device for a motor used for various types of OA apparatus.

2. Description of the Related Art

In recent years, a reduction in the cost of electronic apparatus employed in the field of, for example, office automation has advanced, and thus there has been a demand for an inexpensive motor for such electronic apparatus, which is the heart of a driving system thereof. The cost of the motor is greatly affected by the cost of a bearing element. A highly reliable miniature ball bearing is very expensive, while a relatively inexpensive oilless slide bearing is slightly less reliable than the miniature ball bearing. Thus, in order to achieve a reduction in the cost of the motor, there has been a demand for a highly reliable oilless slide bearing.

The structure of a bearing device for a conventional motor will be described below.

FIG. 6 shows an axial fan motor which is a typical example of a motor employing the above-mentioned oilless slide bearing. In FIG. 6, reference numeral 1 denotes a shaft; reference numerals 2 and 3 respectively denote a rotor frame side oilless slide bearing and an anti rotor frame side oilless slide bearing which rotatably support the shaft 1; reference numeral 4 denotes a thrust plate which axially supports loads in the thrust direction; reference numeral 5 denotes a snap ring for stably bringing the thrust plate 4 into contact with an end surface of the anti rotor frame side oilless slide bearing 3 to rotate the thrust plate 4 together with the shaft 1.

Reference numeral 6 denotes a stator boss for fixedly accommodating the oilless slide bearings 2 and 3; reference numeral 7 denotes a stator boss supporting portion for fixedly supporting the stator boss 6; reference numeral 8 denotes a rotor frame which is coupled to the shaft 1 and is thus rotatable together with the shaft 1; reference numeral 9 denotes a stator fixed to an outer peripheral portion of the stator boss 6. A reference numeral 10 denotes a field magnet adhered to an inner periphery of the rotor frame 8. The motor is rotated as a result of the magnetic repulsion which acts between the field magnet 10 and a driving coil 11 wound around the stator 9.

Reference numeral 12 denotes a fitting oil supplied in order to stabilize the initial lubrication between the end surface of the anti rotor frame side oilless slide bearing 3 and the thrust plate 4; reference numerals 13 and 14 respectively denote an oil thrower for preventing flow of the lubricant from the rotor frame side and a lubricant leakage preventing rubber cap for preventing leakage of the lubricant from the anti rotor frame side; and reference numeral 15 denotes a driving circuit for controlling commutation of the driving coil 11.

The operation of the thus-arranged conventional bearing device will now be described. When the rotor frame 8 and the shaft 1 rotate as a result of the magnetic repulsion which acts between the stator 9 and the field magnet 10, the inner-diameter surfaces of the rotor frame side and anti rotor frame side oilless slide bearings 2 and 3 slide against the outer-diameter surface of the shaft 1, and the end surface of the anti rotor frame side oilless slide bearing 3 slides against the thrust plate 4, thus causing a lubricant to well up due to expansion of and reduction in the viscosity of the lubricant in the oilless slide bearing, caused by the generation of a frictional heat as a result of sliding, and due to the pumping action of the oilless slide bearing itself. In the radial direction, the lubricant which has welled up is pushed into a narrow portion of a gap between the shaft 1 and the inner-diameter surfaces of the rotor frame side and anti rotor frame side oilless slide bearings 2 and 3 in a wedge-like form, generating a pressure in the lubricant. The generated pressure of the lubricant acts on the shaft 1 as a floating force, reducing the frictional resistance between the slide bearings 2 and 3 and the shaft 1. The floating force acts in such a manner that a lubricated condition in which no metal contact occurs is maintained over a long period of time.

In the axial direction, both the oil which has welled up and the fitting oil 12 swirlingly flow in a gap between the end surface of the anti rotor frame side oilless slide bearing 3 and the thrust plate 4, precluding a direct contact therebetween. Thus, a frictional resistance is reduced, and an excellent lubricated condition lasts over a long period of time.

However, in the above-described conventional structure, a force greater than the surface tension of the lubricant present near the thrust plate 4 and the snap ring 5 is exerted by the swirl flow of the lubricant which is generated by the slide of the end surface of the anti rotor frame side oilless slide bearing against the thrust plate 4 in order to axially support thrust load, and the lubricant thereby flows along the inner-diameter surface of the stator boss 6 and reaches as far as the contact between the stator boss 6 and the lubricant leakage preventing rubber cap 14.

If that happens, the lubricant may be absorbed by the rubber cap due to the characteristics of the material thereof. Alternatively, the lubricant whose viscosity has been reduced by the frictional heat may be present in the contact between the lubricant leakage preventing rubber cap 14 and the inner-diameter surface of the stator boss 6. That lubricant present in the contact may flow out to the outside of the motor along the boundary therebetween depending on the magnitude of the contact pressure between the rubber cap 14 and the stator boss 6.

The lubricant which leaks along the boundary may not only flow out to the outside of the motor along the gap between the inner peripheral surface of the stator boss supporting portion and the outer peripheral surface of the lubricant leakage preventing rubber cap, but also penetrate a gap between the stator boss and the stator boss supporting portion, and flows into the motor through the stator.

Such absorption and leakage of the lubricant occur whenever the motor is rotated. Leakage of the lubricant is stopped when the operation of the motor stops by the action of the surface tension of the lubricant and the capillary phenomenon of the oilless slide bearing. Due to the leakage of the lubricant which occurs during the rotation of the motor, the lubricant in the anti rotor frame side oilless slide bearing 3 is consumed greatly. Consumption of the lubricant in the anti rotor frame side oilless slide bearing 3 and the resulting damage to the anti rotor frame side oilless slide bearing 3 induce the damage to the rotor frame side oilless slide bearing 2, even though the oilless slide bearing 2 still contains a sufficient amount of lubricant in it, thus reducing the life of the entire bearing element.

SUMMARY OF THE INVENTION

In view of the aforementioned problems of the conventional art, an object of the present invention is to provide a highly reliable, durable and inexpensive bearing device for a motor which can prevent flow out of a lubricant due to absorption or leakage thereof.

To achieve the above-described object, the present invention provides a bearing device for a motor which comprises an annular oil seal washer, made of a viscoelastic member with at least one adhesive layer provided on surface thereof. The oil seal washer is sandwiched by an end surface of a stator boss and a substantially disk shaped resin cap fixed on an inner peripheral surface of a stator boss supporting portion.

In the thus-arranged bearing device for the motor, when the rotor frame and the shaft rotate due to the magnetic repulsion which acts between the stator and the field magnet and the end surface of the anti rotor frame side oilless slide bearing thereby slides against the thrust plate in order to axially support thrust load, a force exceeding the surface tension of the lubricant near the thrust plate and the snap ring may be exerted due to the swirling flow of the lubricant caused by the sliding, causing the lubricant to flow along the innerdiameter surface of the stator boss to the contact surface between the stator boss and the viscoelastic member with the adhesive layers provided thereon and to the resin cap. However, the lubricant which flows out is absorbed by the viscoelastic member, or the flow of the lubricant is obstructed by both the joined surface between the adhesive layer on one surface of the viscoelastic member and the end surface of the stator boss and the joined surface between the adhesive layer on the other surface of the viscoelastic member and the resin cap, and flow out of the lubricant caused by absorption or leakage thereof can be completely prevented.

DETAILED DESCRIPTION OF THE PREFERRED EMBODIMENT

An embodiment of the present invention will be described with reference to the accompanying drawings.

Figure 1:
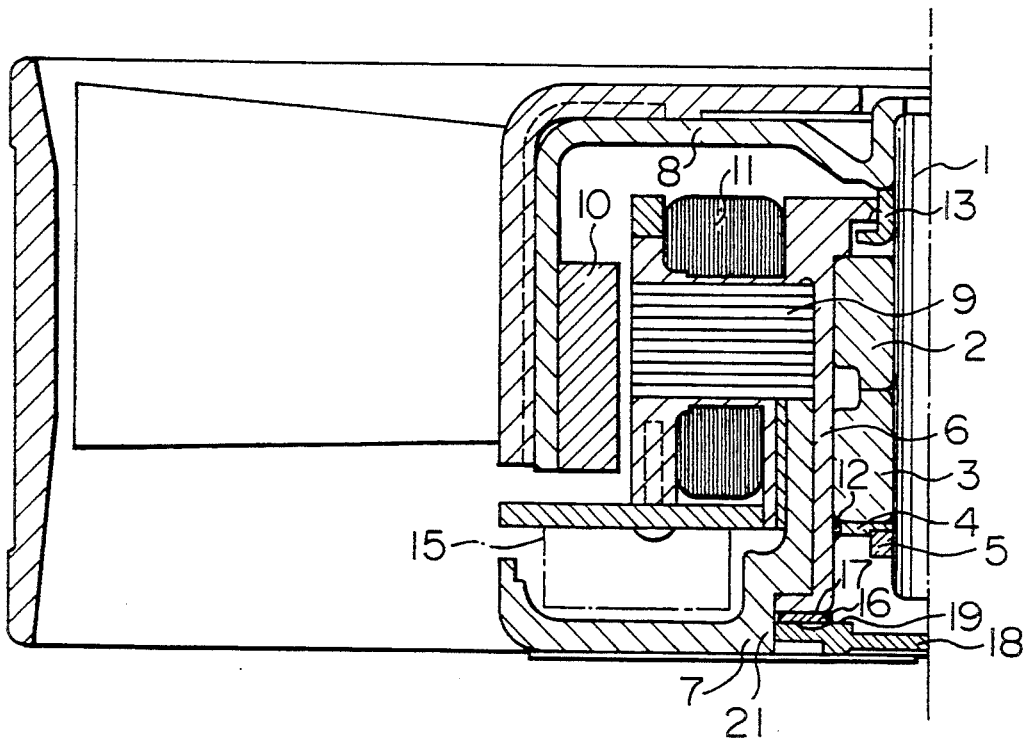
FIG. 1 is a cross sectional view of an axial fan motor to which a first embodiment of a bearing device according to the present invention is applied.

FIG. 1 shows an axial fan motor to which a first embodiment of the bearing device for motor according to the present invention is applied. Identical reference numerals in FIG. 1 to those in FIG. 6 represent similar or identical elements.

Figure 6:
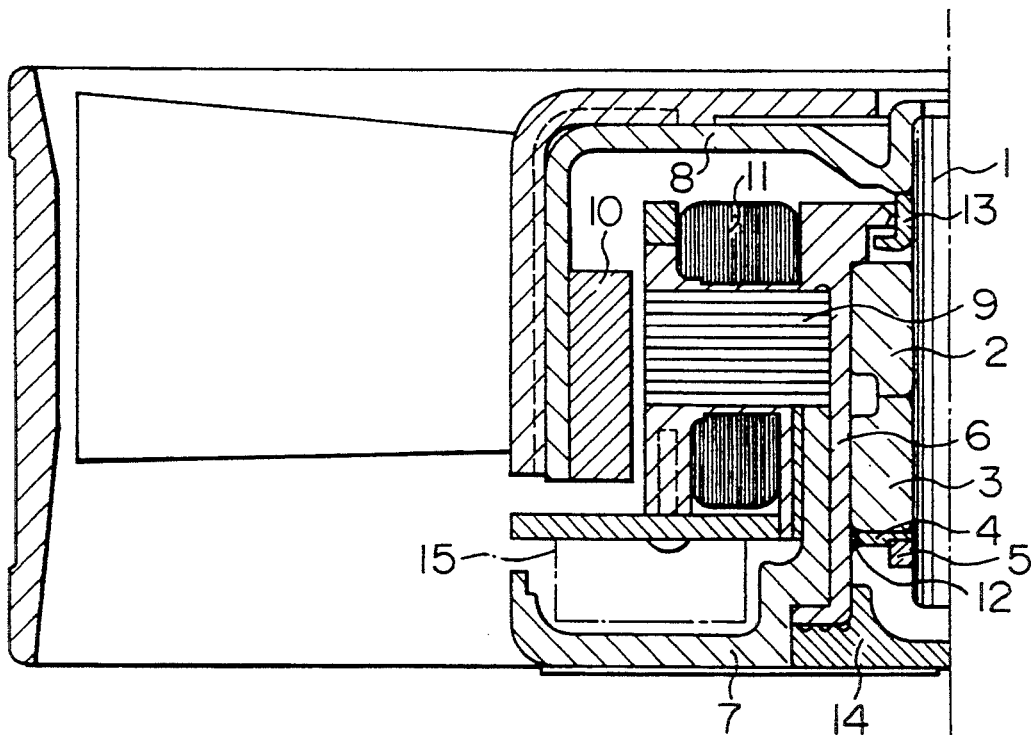
FIG. 6 is a cross sectional view of a conventional bearing device for an axial fan motor.

The bearing device for the axial fan motor, shown in FIG. 1, differs from the conventional device shown in FIG. 6 in that an annular oil seal washer 16 made of a viscoelastic substance (which may be an acrylic resin type foam) having a pressure-sensitive adhesive layer (which may be made of an acrylic adhesive) on each of the two surfaces thereof is used in place of the conventional lubricant leakage preventing rubber cap 14 as means for preventing leakage of the lubricant near the anti rotor frame side oilless slide bearing 3. The oil seal washer 16 is sandwiched by an end surface 17 of the stator boss 6 and an inner surface 19 of a substantially disk-shaped resin cap 18. The resin cap 18 is press fitted into the stator boss supporting portion 7 so that an outer peripheral surface 20 of the resin cap 18 is fixedly pressed against an inner peripheral surface 21 of the stator boss supporting portion 7.

The operation of the bearing device according to the present invention will now be described. In the bearing device for the axial fan motor, having the aforementioned structure, when the rotor frame 8 and the shaft 1 rotate due to the magnetic repulsion which acts between the stator 9 and the field magnet 10 and the end surface of the anti rotor frame side oilless slide bearing 3 thereby slides against the thrust plate 4 in order to axially support thrust load, a force exceeding the surface tension of the lubricant near the thrust plate 4 and the snap ring 5 may be exerted due to the swirling flow of the lubricant caused by the sliding, causing the lubricant to flow along the inner-diameter surface of the stator boss 6 to the contact surface between the stator boss 6 and the viscoelastic member 16 with the adhesive layers and to the resin cap 18. However, the lubricant which flows out is absorbed by the viscoelastic member 16, or the flow of the lubricant is obstructed by both the joined surface between the adhesive layer on one surface of the viscoelastic member 16 and the end surface 17 of the stator boss 6 and the joined surface between the adhesive layer on the other surface of the viscoelastic member 16 and the resin cap 18, and flow out of the lubricant caused by absorption or leakage thereof can be completely prevented.

The end surface 17 of the stator boss, which is generally formed by ultrasonic welding, has convex irregularities, and the oil seal washer 16 is deformable in such a manner that it fits well to the irregular surface of the stator boss because it is made of a viscoelastic substance. As a result, the contact area between the oil seal washer 16 and the stator boss end surface 17 increases, and complete prevention of leakage of the lubricant is thus assured.

Further, since the leakage of the lubricant from the stator boss end surface 17 can be prevented, penetration of the lubricant to the gap between the stator boss 6 and the stator boss supporting portion 7, which would occur in a conventional bearing device, can be prevented, thus preventing flow of the lubricant into the inside of the motor.

Although the oil seal washer 16 has an annular shape in this embodiment in order to prevent contact thereof to the shaft 1, if it is permitted in terms of the axial dimensions, it may have a disk shape. Alternatively, in order to enhance the joining strength between the adhesive layer and the resin cap, the inner surface 19 of the resin cap 19 may be roughened by grain forming to achieve the anchoring effect of the adhesive layer.

If it is possible to firmly grip the viscoelastic member 16 between the stator boss end surface 17 and the resin cap 18, an oil seal washer may have the adhesive layer only on one surface thereof or have no adhesive layer at all.

Other structures of fixing the oil seal washer will now be described with reference to FIGS. 2 through 5.

Figure 2:
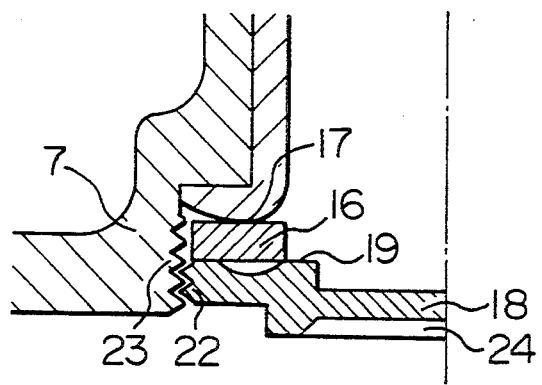
FIG. 2 is a cross sectional view showing a second embodiment of the bearing device according to the invention.
Figure 3:
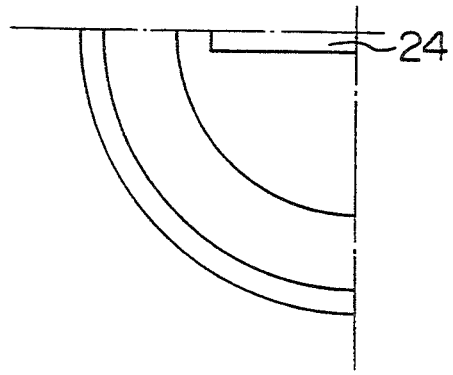
FIG. 3 is a bottom view of a resin cap in the second embodiment of the invention.

In the structure shown in FIGS. 2 and 3, the outer peripheral surface of the resin cap 18 is threaded in the axial direction of the shaft 1 to form a male screw 22, and the inner peripheral surface of the stator boss supporting portion 7 is threaded to form a female screw 23 which engages with the male screw 22. The oil seal washer 16 is fixed between the stator boss 6 and the resin cap 18 by the engagement of the male and female screws 22 and 23. In that case, in order to rotate the resin cap 18, a rectangular groove 24 must be formed on the outer surface of the resin cap 18, and the oil seal washer 16 must not have an adhesive layer on the surface thereof which opposes the inner surface 19 of the resin cap 18.

Figure 4:
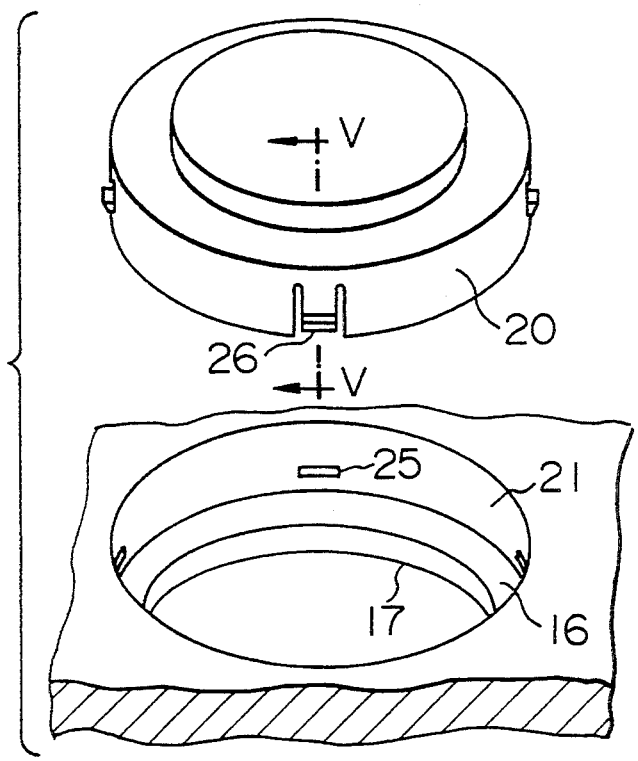
FIG. 4 is a perspective view showing a third embodiment of the bearing device according to the invention.
Figure 5:
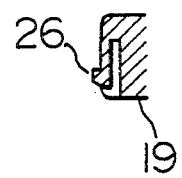
FIG. 5 is a cross-section taken along the line V—V of FIG. 4.

In another oil seal washer fixing structure shown in FIGS. 4 and 5, the inner peripheral surface 21 of the stator boss supporting portion 7 has a plurality of recessed portions 25 (four recessed portions in the illustrated structure), and the outer peripheral surface 20 of the resin cap 18 has a plurality of snap fit type protruding portions 26 which engage with the recessed portions 25. The oil seal washer 16 is fixed between the stator boss end surface 17 and the inner surface 19 of the resin cap 18 by bringing the recessed portions 25 into engagement with the protruding portions 26.

Other oil seal washer fixing structure will also be considered. In a modification of, for example, the structure shown in FIGS. 2 and 3, a plurality of tapered key-form grooves are formed on the inner peripheral surface of the stator boss supporting portion in such a manner that they are connected to the outer end surface of the motor, and a plurality of protrusions, which engage with the key-form grooves, are formed on the outer peripheral surface of the resin cap. The oil seal washer is fixed by turning the resin cap while bringing the protrusions into engagement with the grooves.

As will be understood from the foregoing description, in the present invention, since the annular oil seal washer, made of the viscoelastic member having the adhesive layer on each of the two surfaces thereof, is sandwiched by the stator boss end surface and the substantially disk-like shaped resin cap and the outer peripheral surface of the resin cap is fixedly pressed against the inner peripheral surface of the stator boss supporting portion, it is possible to greatly diminish a reduction in the life of the anti rotor frame side oilless slide bearing caused by the leakage and flow out of the lubricant, which would occur in a conventional oilless slide bearing during the rotation of the motor and thus precludes an increase in the reliability of the motor.

When the consumption of the lubricant in the anti rotor frame side oilless slide bearing is sufficiently improved, a deviation of the conventional lubricant consumption rate can be corrected. Accordingly, the lubricant contained in the oilless slide bearing can be effectively used, and the advantages of the oilless slide bearing, the long life and inexpensiveness, can thus be utilized.

Further, since the oil seal washer made of a viscoelastic substance is used, even if the surface to be sealed by the oil seal washer has a complicated shape, the oil seal washer can fit well to its shape. As a result, a reliable joined state of the oil seal washer can be maintained regardless of the shape of the sealed surface, and flow of the lubricant can thus be completely prevented.

What is claimed is:

1. A bearing device for a motor including a rotor frame with a field magnet provided on an inner periphery thereof, a shaft coupled to said rotor frame, an oilless bearing for rotatably supporting said shaft, a stator boss for fixedly accommodating said oilless bearing a stator boss supporting portion for supporting said stator in position, and a stator fixed to an outer peripheral portion of said stator boss, said bearing device comprising:

an annular oil seal washer made of a viscoelastic member with at least one adhesive layer provided on a surface thereof and a substantially disk shaped resin cap fixed on an inner peripheral surface of said stator boss supporting portion, said oil seal washer being sandwiched by an end surface of said stator boss and a substantially disk shaped resin cap, whereby flow out of the lubricant due to a leakage thereof in said oilless bearing is prevented.

2. A bearing device for a motor according to claim 1, wherein said oil seal washer has said adhesive layer on the surface thereof opposed to said stator boss, and said resin cap is formed with, at an outer peripheral surface, a male screw extending in an axial direction of said shaft and said stator boss supporting portion is formed with, at an inner peripheral surface, a female screw extending in the axial direction, whereby said resin cap is fixed on said inner peripheral surface of said stator boss supporting portion by meshing engagement of said male screw and said female screw.

3. A bearing device for a motor according to claim 1, wherein said resin cap is formed with, at an outer peripheral surface, a plurality of snap fit type convex portions and said stator boss supporting portion is formed with, at an inner peripheral surface, a plurality of recessed portions corresponding to said plurality of convex portions, whereby said resin cap is fixed on said inner peripheral surface of said stator boss supporting portion by bringing said plurality of convex portions into engagement with said plurality of recessed portions.

4. A bearing device for a motor according to claim 1, wherein resin cap is fixed on said inner peripheral surface of said stator boss supporting portion by press fitting said resin cap into said stator boss supporting portion.

* * * * *